(12) United States Patent
Burklin et al.

(10) Patent No.: US 7,924,889 B2
(45) Date of Patent: Apr. 12, 2011

(54) METHOD FOR TRANSMITTING PACKETS IN A TRANSMISSION SYSTEM

(75) Inventors: Helmut Burklin, Rennes (FR); Jean-Francois Fleury, Beijing (CN); Mary-Luc Champel, Marpire (FR)

(73) Assignee: Thomson Licensing, Boulogne Billancourt (FR)

( * ) Notice: Subject to any disclaimer, the term of this patent is extended or adjusted under 35 U.S.C. 154(b) by 65 days.

(21) Appl. No.: 11/630,171

(22) PCT Filed: Jun. 22, 2005

(86) PCT No.: PCT/EP2005/052919
§ 371 (c)(1),
(2), (4) Date: Nov. 16, 2007

(87) PCT Pub. No.: WO2006/003105
PCT Pub. Date: Jan. 12, 2006

(65) Prior Publication Data
US 2008/0187008 A1    Aug. 7, 2008

(30) Foreign Application Priority Data

Jul. 1, 2004 (EP) .................................... 04291672

(51) Int. Cl.
*H04J 3/06* (2006.01)
(52) U.S. Cl. .................. 370/516; 370/356; 370/395.64; 370/401; 370/498; 370/514; 375/240.26; 375/240.28; 375/372; 375/376; 709/218; 709/230; 709/236; 709/249
(58) Field of Classification Search .................. 370/356, 370/389, 395.64, 401, 466, 498, 503, 514, 370/536; 375/240.26–240.28, 372, 376; 709/218, 230, 236, 249
See application file for complete search history.

(56) References Cited

U.S. PATENT DOCUMENTS

| | | | | |
|---|---|---|---|---|
| 6,041,067 A | * | 3/2000 | Takamori et al. | 370/514 |
| 6,763,390 B1 | * | 7/2004 | Kovacevic et al. | 709/231 |
| 6,785,733 B1 | * | 8/2004 | Mimura et al. | 709/236 |
| 6,917,247 B2 | * | 7/2005 | Schoner | 331/18 |
| 7,116,894 B1 | * | 10/2006 | Chatterton | 386/95 |

(Continued)

OTHER PUBLICATIONS

D. Hoffman et al: "RTP Payload Format for MEPG1/MPEG2 Video-RFC 2250", RTP Payload Format for MPEG1 MPEG2, Jan. 1998.

(Continued)

*Primary Examiner* — Ayaz R Sheikh
*Assistant Examiner* — Andrew C Lee
(74) *Attorney, Agent, or Firm* — Robert D. Shedd; Jeffrey M. Navon

(57) ABSTRACT

Methods for transmitting first packets encapsulated in second packets in a transmission system in which part of the first packets contain a first timing reference for synchronization of a receiver clock and at least part of said second packets contain a second timing reference for reducing transmission jitter of the second packets at the receiver is described. This method provides, at the transmitter, collecting first packets, determining whether a collected first packet contains a first timing reference and triggering transmission of a second packet encapsulating collected first packets including the first packet containing the first timing reference in response to a positive determination.

5 Claims, 4 Drawing Sheets

U.S. PATENT DOCUMENTS

| | | | |
|---|---|---|---|
| 7,159,233 B2* | 1/2007 | Son et al. | 725/86 |
| 7,227,899 B2* | 6/2007 | Balakrishnan et al. | 375/240.26 |
| 7,248,590 B1* | 7/2007 | Liu | 370/395.64 |
| 7,349,386 B1* | 3/2008 | Gou | 370/356 |
| 7,397,822 B2* | 7/2008 | Golan et al. | 370/498 |
| 7,447,164 B2* | 11/2008 | Ueda et al. | 370/252 |
| 7,545,794 B2* | 6/2009 | Loukianov | 370/350 |
| 7,561,582 B2* | 7/2009 | Ohta et al. | 370/395.62 |
| 2002/0003799 A1* | 1/2002 | Tomita | 370/392 |
| 2003/0185245 A1 | 10/2003 | Kang et al. | |
| 2005/0036556 A1* | 2/2005 | Balakrishnan et al. | 375/240.26 |
| 2005/0036557 A1* | 2/2005 | Balakrishnan et al. | 375/240.28 |
| 2005/0169268 A1* | 8/2005 | Tomita | 370/389 |
| 2005/0169269 A1* | 8/2005 | Tomita | 370/389 |
| 2005/0177643 A1* | 8/2005 | Xu | 709/231 |

OTHER PUBLICATIONS

Search Report Dated Sep. 1, 2005.

"Information Technology—Generic Coding of Moving Pictures and Associated Audio Information: Systems", International Standard, ISO/IEC 13818-1:2000(E), Second Edition Dec. 1, 2000, pp. 1-154.

"Information Technology—Generic Coding of Moving Pictures and Associated Audio Information: Video", International Standard, IOS/IEC 13818-2:2000(E), Mar. 1, 2002, pp. 1-208.

D. Hoffman et al., "RTP Payload Format for MPEG1/MPEG2 Video", Network Working Group, Request for Comments: 2250, Jan. 1998, pp. 1-15.

* cited by examiner

METHOD FOR TRANSMITTING PACKETS IN A TRANSMISSION SYSTEM

This application claims the benefit, under 35 U.S.C. §365 of International Application PCT/EP2005/052919, filed Jun. 22, 2005, which was published in accordance with PCT Article 21(2) on Jan. 12, 2006 in English and which claims the benefit of European patent application No. 04291672.6, filed Jul. 1, 2004.

BACKGROUND OF THE INVENTION

The document RFC 2250 [3] describes how several MPEG2 transport stream and program stream packets are to be carried inside the payload of an RTP packet, and also specifies that a single timestamp is attached to each RTP packet.

The MPEG2 specification [1] describes how timestamps are included inside an MPEG2 stream, how at the destination the different timestamps are used to recover a clock in synchronism with the clock at the source side, and how the different timestamps are used to feed the MPEG decoder and to control when to display the elements of the transmitted stream.

The DVB-IP specification [4] describes a generic architecture for distribution of multimedia services over IP networks. This specification adopts RFC2250 as the mechanism for transporting MPEG2 streams over RTP. This is probably the standard using RFC 2250.

Since several MPEG2 packets are carried inside a single RTP packet, some assumptions are needed if the timing of all MPEG2 packets is to be truly reconstructed at the destination side. Usually it is assumed that the entire MPEG2 stream is a constant bit rate stream, or that it is at least piecewise constant, i.e. that the bitrate changes only at the time where PCR or SCR timestamps are inserted inside the stream. This is not necessarily true, and especially, but not only, when only a partial MPEG2-TS is carried (a stream with 'holes'), e.g. a stream that initially was a constant bit rate stream but in which a certain (possibly large) number of packets have been deleted.

If a number of MPEG2 packets are carried inside such an RTP packet, the RTP timestamp is created at the time that the RTP packet's construction is finalised, i.e. at the time the last MPEG2 packet arrives at the sender. The generation of the RTP packets from the partial TS is done according to FIG. 3

At the destination side, this means that only this last packet's time is known; the time of all other MPEG2 packets can only be estimated. The reconstructed timing of the packets includes a jitter that is given by the uncertainty of the time when the MPEG2 packet was put inside the RTP buffer. This jitter is equal to the time difference of the transmission of two succeeding RTP packets (i.e. to the difference of their time stamps). The MPEG2 clock recovery now extracts from this 'jittered' stream the PCR or SCR timestamps, feeds them to a PLL to reconstruct the MPEG clock. The supplementary jitter introduced by the RTP transmission makes that this PLL needs to be more efficient than in the case of an MPEG stream transmitted directly (without RTP). It also leads to a longer time before the clock is synchronised.

SUMMARY OF THE INVENTION

The invention resides part in recognizing the above problem and part in proposing the solution as defined in the claims.

The invention concerns a method for transmitting first packets encapsulated in second packets in a transmission system in which part of the first packets contain a first timing reference for synchronization of a receiver clock and at least part of said second packets contain a second timing reference for reducing transmission jitter of the second packets at the receiver, characterized by the steps, at the transmitter, of:
collecting first packets;
determining whether a collected first packet contains a first timing reference
triggering transmission of a second packet encapsulating collected first packets including said first packet containing the first timing reference in response to a positive determination.

According to an embodiment of the invention, the method further comprises the step of triggering transmission of a second packet if the number of collected first packets reaches a predetermined value.

According to an embodiment of the invention, the first packets are MPEG 2 Transport Stream packets and the first time reference is a PCR.

According to an embodiment of the invention, the second packets are RTP packets and the second time reference is a timestamp determined by the transmitter for incorporation into individual RTP packets.

According to an embodiment of the invention, the method further comprises the step of respecting a maximum time interval between transmission of two consecutive RTP packets.

BRIEF DESCRIPTION OF THE DRAWINGS

More advantages of the invention will appear through the description of a particular, non-restricting embodiment of the invention. The embodiment will be described with reference to the following figures.

DETAILED DESCRIPTION OF PREFERRED EMBODIMENTS

The present embodiment concerns a partial MPEG2 TS (Transport Stream). However, the invention is not limited to a partial MPEG2 TS stream. It may apply to full MPEG2 TS streams, but also to other kinds of packet transmissions where similar synchronization and jitter problems are present.

Figure 1:
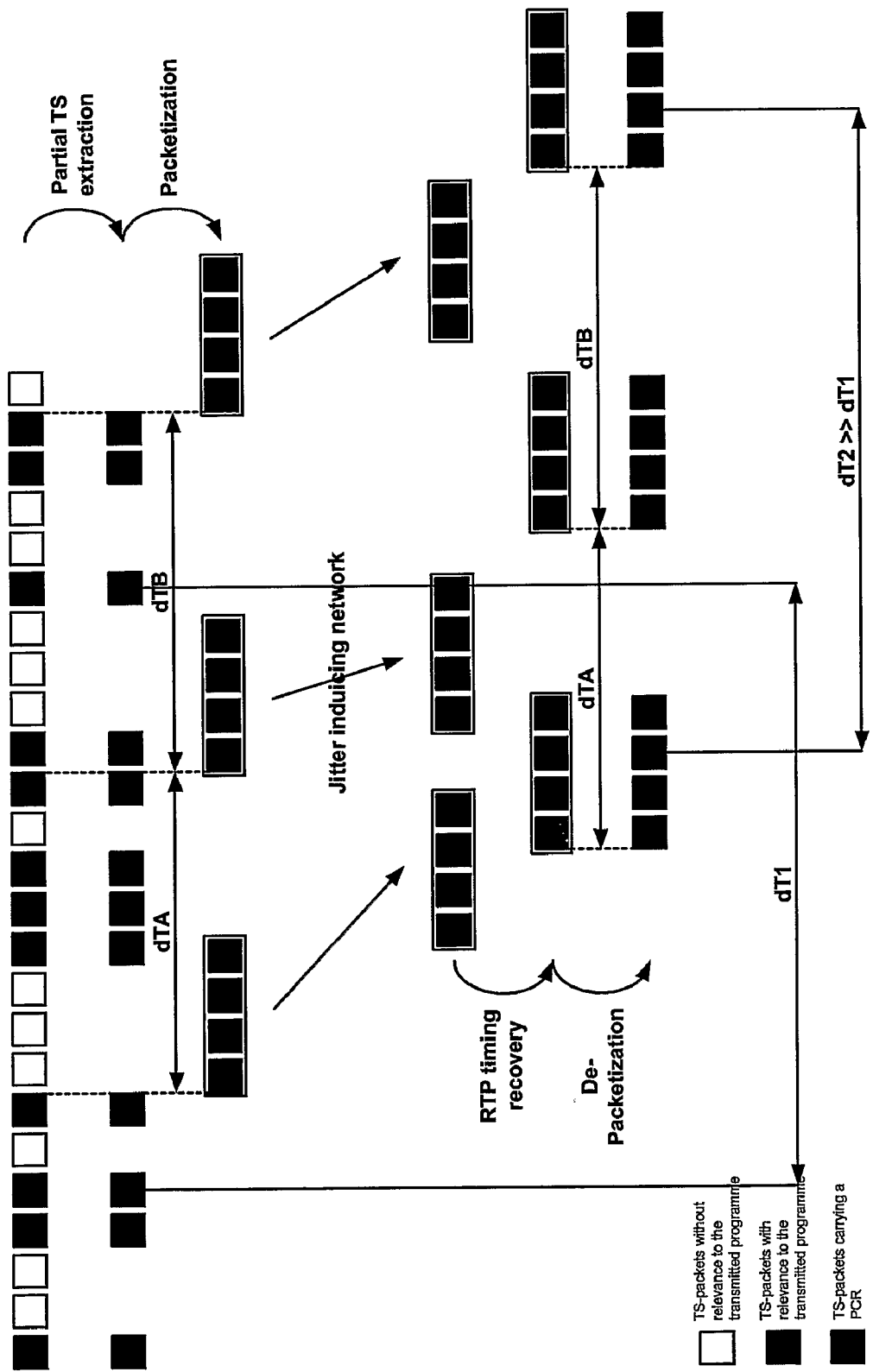
FIG. 1 is a diagram illustrating the jitter problem resulting from the encapsulation of MPEG2 TS packets.

The diagram of FIG. 1 illustrates the jitter introduction phenomenon. The top line of the figure illustrates a full multiplexed MPEG 2 TS stream, comprising individual MPEG2 TS packets. A partial stream is extracted from the full stream. Packets containing MPEG2 system PCR timestamps are shown as indicated. It is assumed here that the RTP packet payload is composed of a four MPEG 2 TS packets and that an RTP packet is sent every time four MPEG2 PS packets are present in the transmitter buffer. dTA and dTB respectively represent the real-time intervals between subsequent RTP packets, at the level of the transmitter, as illustrated. These are also the intervals required to collect enough MPEG2 TS packets for filling the payload of each RTP packet. After these packets have been sent, this timing relationship is modified by the jitter introduced by the network. Upon reception, the RTP timestamps are used to restore dTA and dTB. However, it has been recognized by the inventors that it is assumed by the receiver that all MPEG 2 TS packets of a single RTP packet are received at the same time (i.e. they are fed to the receiver buffer as a burst when the RTP timestamp in the RTP packet header corresponds to the receiver's RTP clock). Consequently, a supplementary jitter is introduced, since the time interval between two consecutive MPEG2 TS packets in the original stream may be different than the time interval between the writings of each of these packets into the receiver decoder's buffer.

The time delay between two consecutive MPEG2 TS packets before packetization, transmission via a jitter-inducing network and de-packetization is illustrated in FIG. 1 by arrow marked 'dT1'. The time delay between the same two subsequent MPEG2 TS packets after packetization, transmission via a jitter-inducing network and de-packetization according to prior art is illustrated in FIG. 1 by the arrow marked 'dT2>>dT1', indicating that the delay between two consecutive MPEG2 TS packets in the original stream, dT1, may be different than the time interval between the writings of each of these packets into the receiver's decoder buffer, dT2.

Figure 2:
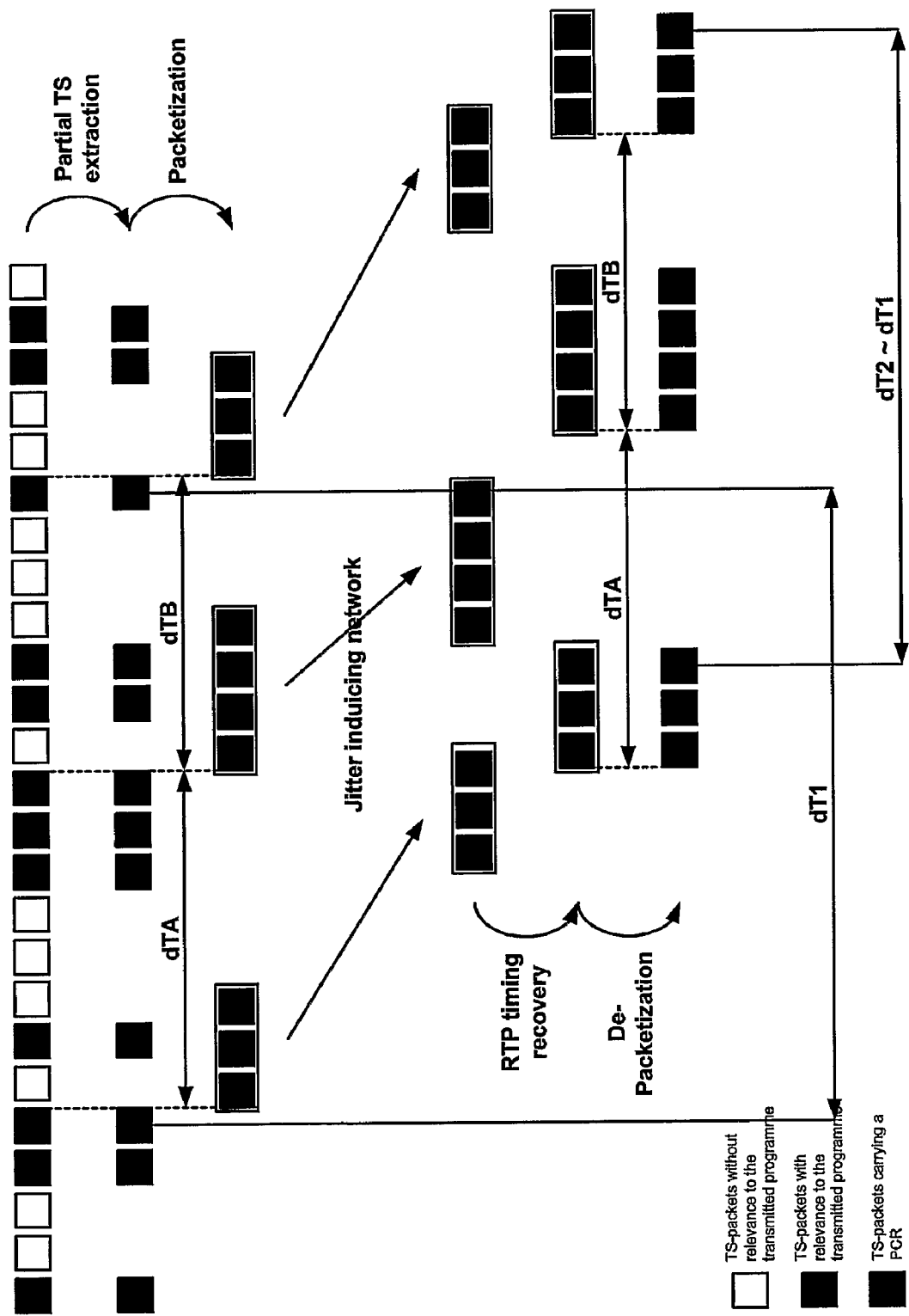
FIG. 2 is a diagram similar to that of FIG. 1, where the embodiment of the invention is used to reduce jitter.
Figure 3:
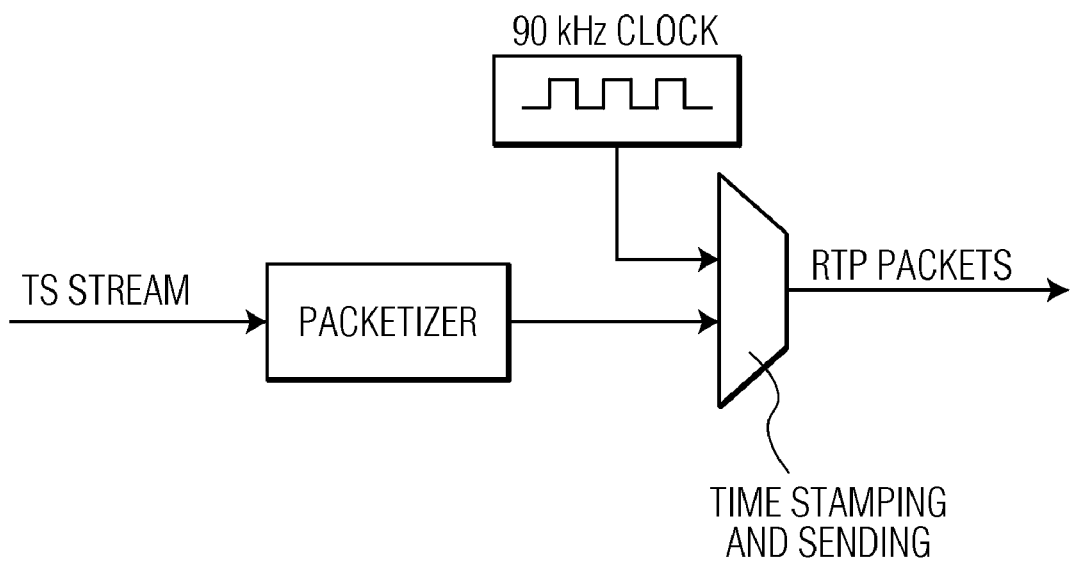
FIG. 3, prior art, is a block diagram of a transmitter according to the prior art.

This is illustrated by arrows marked "dT1" and "dT2~dT1" in FIG. 2, where "dT1" indicates the time delay between two consecutive MPEG2 TS packets before packetization, transmission via a jitter-inducing network and de-packetization. The time delay between the same two subsequent MPEG2 TS packets after packetization, transmission via a jitter-inducing network and de-packetization with the method for transmission of packets according to the invention is illustrated by the arrow marked 'dT2~dT1', indicating that the delay between two consecutive MPEG2 TS packets at the receiver side, dT2, is quite close to the delay between these packets at the sender side, dT1.

It is proposed to send the RTP packet as soon as an MPEG2-TS packet containing an MPEG2 PCR is present and not to wait systematically until the RTP packet has reached its maximum size (typically corresponding to a payload of 7 MPEG2 TS packets) to send the RTP packet. Thus the RTP timestamp is generated with a fixed delay compared to the reception of the MPEG2 packet comprising the time reference.

The partial MPEG2 TS is extracted from the full TS at the sender side. The headers of all TS packets are analysed, and it is decided if they contain a PCR timestamp (this is easily done, since it is signalled in the header). When this is not the case, the TS packet is put into the RTP buffer. When the buffer is full (usually after seven TS packets, in order not to exceed the maximum Ethernet payload. There may be other criteria or another maximum size) the RTP packet is timestamped by a—usually free running—90 kHz clock and sent out as usual. When the TS packet contains a PCR, it is also put into the RTP buffer, but then the RTP packet is immediately timestamped and sent out, without waiting for other (e.g. buffer full) conditions. The timestamped MPEG2 packet is thus always placed at the end of the RTP packet payload.

Figure 4:
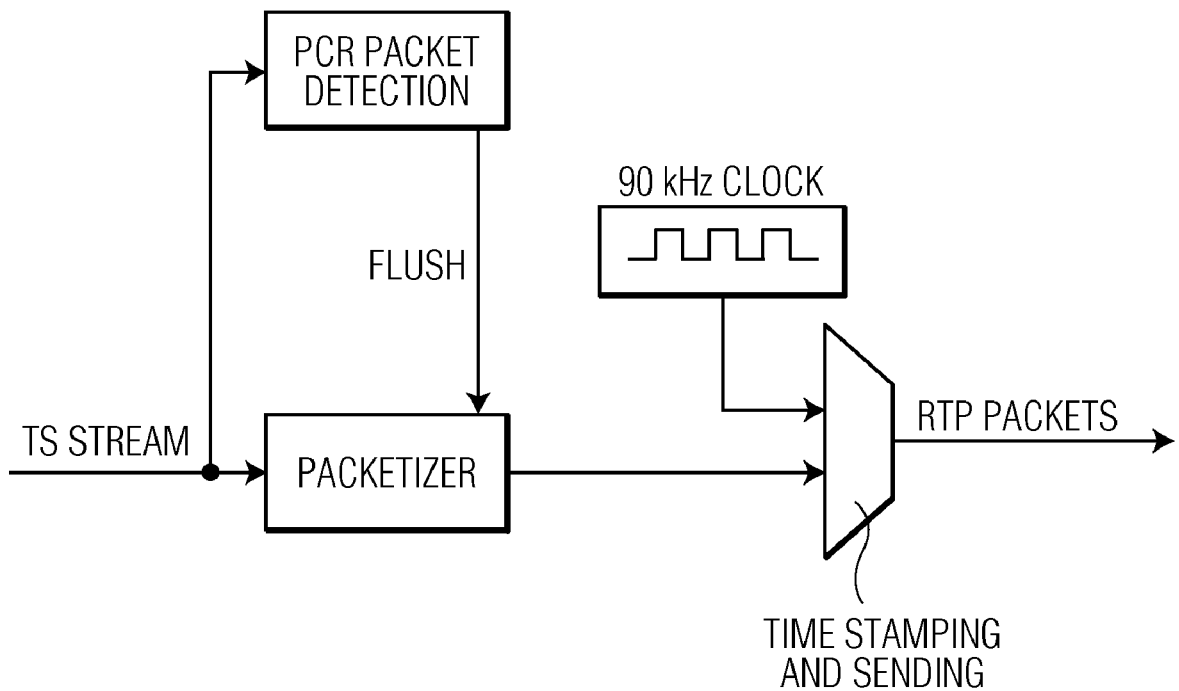
FIG. 4 is a block diagram of a transmitter according to the present embodiment.

FIG. 4 is a block diagram showing the relevant components of a receiver.

Figure 5:
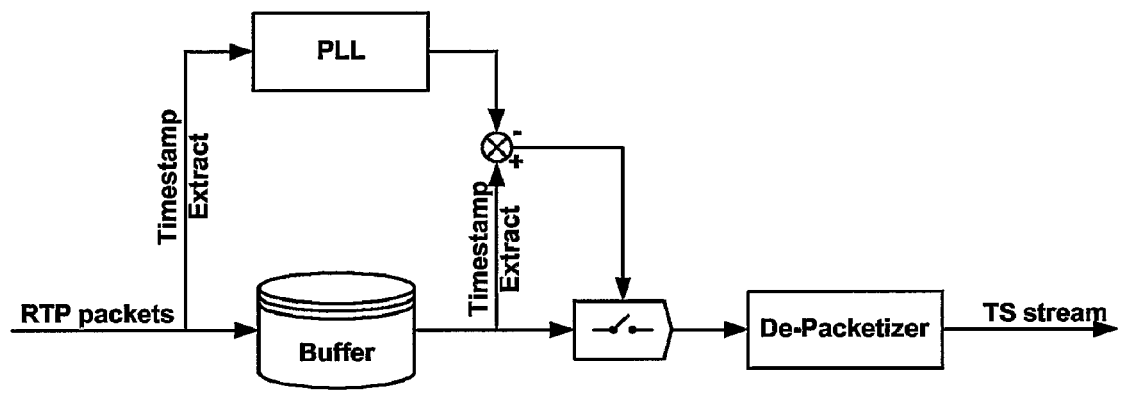
FIG. 5 is a block diagram of a receiver and decoder of RTP packets encapsulating MPEG 2 TS packets.

Once the RTP packet is received on the other side, it is buffered. Packets are released from the buffer when their RTP timestamp matches the local 90 kHz clock+a fixed delay. The local 90 kHz clock may be synchronised to the sender's 90 kHz clock by any means, e.g. a PLL at the network interface may examine the timestamp in the RTP packet at arrival time and adjust the value of the local clock to stay synchronised with the senders clock. At the output of this whole mechanism described in FIG. 5

The MPEG2 decoder is fed with the MPEG2 TS packets with a rhythm approximately close to the one at which the RTP packets were sent. Due to the fact that an MPEG2-TS packet carrying a PCR is always the last packet inside an RTP packet, the RTP timestamps build a rhythm quite identical to the rhythm of MPEG2-TS PCR packets. The jitter mentioned in relation with FIG. 1 is eliminated, since the time interval between any PCR—holding MPEG2 TS packet and the beginning of the RTP packet that transports it is fixed. Although in the present embodiment, the PCR-holding MPEG2 TS packet is always the last packet in the RTP packet, it suffices that its position in each RTP packet where it is present remains fixed. At the receiver side, as the RTP rhythm is rebuilt, the MPEG2-TS PCR packets rhythm is thus also rebuilt with more precision than in the raw packetization of FIG. 1. FIG. 2 gives an example of the scheme according to the present embodiment, with an RTP encapsulation of a maximum of four MPEG2-TS packets for each RTP packet. In this case, the time difference between two MPEG2-TS packets at the receiver side is quite close to the one at the sender side, and thus the MPEG decoder clock resynchronisation will be quicker.

Note that this can be combined with further conditions: according to a variant embodiment, it may e.g. be interesting to limit the maximum time interval between successive RTP packets, to facilitate recovery of the RTP clock at the receiver.

The invention can also be improved by setting the IP packet that contains a PCR or SCR with the highest possible priority. For example, in the frame of DVB-IP (see reference at the end of this text), it is possible to set individual packet priorities with the aim of providing a certain quality of service (using the DiffServ Code Point in a packet's header for instance). This would make sure that such an IP packet would suffer as little as possible from possible router congestion created by other network traffic and therefore would add even more stability on the time used to send such an IP packet from the source server to the client box.

The invention reduces jitter at MPEG clock recovery, while staying compliant with RFC2250. Also, standard MPEG2 decoders can be used, even for partial transport streams, if the buffer inside the decoder is sufficient to keep the content of one RTP packet (usually seven MPEG2 TS packets=7*188 bytes).

This applies to MPEG2 system streams also if they carry, e.g., MPEG4-Part10 [2] compressed video.

Further information regarding MPEG2 Video and MPEG Systems can be found in the following documents: ISO/IEC 13818-1:2000 'Information Technology—Generic coding of moving pictures and associated audio information: Systems, ISO' and ISO/IEC 13818-2:2000 'Information Technology—Generic coding of moving pictures and associated audio information: Video, ISO'.

The invention claimed is:

1. Method for transmitting packets wherein first packets are encapsulated in second packets in a transmission system in which part of the first packets contain a first timing reference for synchronization of a receiver clock and at least part of said second packets contain a second timing reference for reducing transmission jitter of the second packets at the receiver, said first timing reference generated by means of a first clock, and said second timing reference being generated by means of a second clock, the method comprising the steps, at a transmitter, of:

collecting first packets;

determining whether a collected first packet contains a first timing reference; and immediately triggering transmission of a second packet encapsulating collected first packets including said first packet containing the first timing reference upon determination that said collected first packet contains said first timing reference, said second timing reference of said second packet being set, upon said transmission, to a current value of said second clock, said second timing reference corresponding to a transmission time of said first packet containing the first timing reference.

2. Method according to claim 1, further comprising the step of triggering transmission of a second packet if the number of collected first packets reaches a predetermined value.

3. Method according to claims 1, wherein the first packets are Moving Pictures Expert Group 2 Transport Stream packets and the first timing reference is a Program Clock Reference.

4. Method according to claim 1 or 2, wherein the second packets are Real-time Transport Protocol packets and the second timing reference is a timestamp determined by the transmitter for incorporation into individual Real-time Transport Protocol packets.

5. Method according to claim 4, further comprising the step of respecting a maximum time interval between transmission of two consecutive Real-time Transport Protocol packets.

* * * * *